(12) United States Patent
Young et al.

(10) Patent No.: US 6,282,295 B1
(45) Date of Patent: Aug. 28, 2001

(54) AUTO-RECOVERABLE AND AUTO-CERTIFIABLE CRYPTOSTEM USING ZERO-KNOWLEDGE PROOFS FOR KEY ESCROW IN GENERAL EXPONENTIAL CIPHERS

(76) Inventors: Adam Lucas Young, 535 W. 110th St., Apt. 12J; Marcel Mordechay Yung, 605 W. 112th St., Apt. 4H, both of New York, NY (US) 10025

( * ) Notice: Subject to any disclaimer, the term of this patent is extended or adjusted under 35 U.S.C. 154(b) by 43 days.

(21) Appl. No.: 08/959,351

(22) Filed: Oct. 28, 1997

(51) Int. Cl.[7] .................................................... H04L 9/30

(52) U.S. Cl. ...................... 380/286; 380/30; 713/156; 713/180

(58) Field of Search ............................. 380/28, 286, 30, 380/156, 180

(56) References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,625,076 | 11/1986 | Okamoto et al. . |
| 4,641,346 | 2/1987 | Clark et al. . |
| 4,748,668 | 5/1988 | Shamir et al. . |
| 4,881,264 | 11/1989 | Merkle . |
| 4,933,970 | 6/1990 | Shamir . |

(List continued on next page.)

OTHER PUBLICATIONS

"Provably Secure and Practial Identifications Schemes and Corresponding Signature Schemes", Taksuaki Okamoto, pp. 32–53.

(List continued on next page.)

*Primary Examiner*—Gail Hayes
*Assistant Examiner*—James Seal
(74) *Attorney, Agent, or Firm*—Schweitzer Cornman Gross & Bondell LLP

(57) ABSTRACT

A method is provided for an escrow cryptosystem that is essentially overhead-free, does not require a cryptographic tamper-proof hardware implementation (i.e., can be done in software), is publicly verifiable, and cannot be used subliminally to enable a shadow public key system. A shadow public key system is an unescrowed public key system that is publicly displayed in a covert fashion. The keys generated by the method are auto-recoverable and auto-certifiable (abbrev. ARC). The ARC Cryptosystem is based on a key generation mechanism that outputs a public/private key pair, and a certificate of proof that the key is recoverable by the escrow authorities. Each generated public/private key pair can be verified efficiently to be escrowed properly by anyone. The verification procedure does not use the private key. Hence, the general public has an efficient way of making sure that any given individual's private key is escrowed properly, and the trusted authorities will be able to access the private key if needed. Since the verification can be performed by anyone, there is no need for a special trusted entity, known in the art as a "trusted third party". The proof and verification method involves one party proving to a second party that a third party can gain access to an encrypted value. In addition, the system is designed so that its internals can be made publicly scrutinizable (e.g., it can be distributed in source code form). This differs from many schemes which require that the escrowing device be tamper-proof hardware. The system is efficient and can be implemented as a "drop-in" replacement to an RSA or ElGamal cryptosystem. The system is applicable for lawenforcement, file systems, e-mail systems, certified e-mail systems, and any scenario in which public key cryptography can be employed and where private keys or information encrypted under public keys need to be recoverable. The system security relies solely on the security of cipher systems involved whose security has been extensively studied in the past.

26 Claims, 5 Drawing Sheets

U.S. PATENT DOCUMENTS

| | | |
|---|---|---|
| 4,995,082 | 2/1991 | Schnorr . |
| 5,005,200 | 4/1991 | Fischer . |
| 5,097,504 | 3/1992 | Camion et al. . |
| 5,231,668 | 7/1993 | Kravitz . |
| 5,276,737 | 1/1994 | Micali . |
| 5,315,658 | 5/1994 | Micali . |
| 5,557,346 | 9/1996 | Lipner et al. . |
| 5,557,765 | 9/1996 | Lipner et al. . |
| 5,633,928 | 5/1997 | Lenstra et al. . |
| 5,633,929 * | 5/1997 | Kaliski ................................. 380/23 |
| 5,640,454 | 6/1997 | Lipner et al. . |
| 5,647,000 | 7/1997 | Leighton . |
| 5,796,830 | 8/1998 | Johnson et al. . |
| 5,818,573 | 9/1998 | Johnson et al. . |

OTHER PUBLICATIONS

Federal Register/vol. 62, No. 92/ Tuesday, May 13, 1997/ Notices, pp. 26293,26294.

R. Anderson, M. Roe, "The GCHQ Protocol and Its Problems", Eurocrypt '97, pp. 134–148, Springer–Verlag 1997.

M. Bellare, P. Rogaway, "Optimal Asymmertic Encryption", Eurocrypt '94, pp. 92–111, Springer–Verlag, 1994.

D. Chaum, "Blind Signatures for Untraceable Payments".

D. Chaum, T.P. Pedersen, "Wallet Databases with Observers".

D. Denning, D. Brandstad, "A Taxonomy for Key Escrow Encryption Systems", Communications of the ACM, vol. 39, n. 3, , 1996.

A. De Saints, Y. Desmedt, Y. Frankel, M. Yung, "How to Share a Function Securrely", ACM STOC '94, pp. 522–533, 1994.

Y. Desmedt, Y. Frankel, "Threshold cryptosystems", CRYPTO '89, pp. 307–315, Springer–Verlag, 1989.

Y. Desmedt, "Securing Traceability of Ciphertexts –Towards a Secure Software Key Escrow System", Eurocrypt '95, pp. 147–157, Springer–Verlag, 1995.

W. Diffie, M. Hellman, "New Directions in Cryptography", IEEE Transactions on Information Theory, 22, pp. 644–654, 1976.

T. ElGamal, "A Public Key Cryptosystem and a Signature Scheme Based on Discrete Logarithms", CRYPTO '84, pp. 10–18, Springer–Verlag, 1985.

P. Feldman, "A Practical Scheme for Non–interactive Verifiable Secret Sharing", 28th annual FOCS, pp. 427–437, 1987.

A. Fiat, A. Shamir, "How to Prove Yourself: Practical Solutions to Identification and Signature Problems", CRYPTO '86, pp. 186–194, Springer–Verlag, 1987.

Y. Frankel, M. Yung, "Escrow Encryption Systems Visited: Attacks, Analysis and Designs,"CRYPTO '95, Spinger–Verlag, 1995.

R. Ganesan, "How To Use Key Escrow", Communications of the ACM, v. 39, n.3, p. 33, 1996.

S. Goldwasser, S. Micali, R. Rivest, "A Digital Signature Scheme Secure Aganist Adaptive Chosen–Message Attacks", SAIM Journal on Computing, vol. 17, No. 2, 1988.

IBM, SecureWay, key recovery technology document, available at http://www.ibm.com/Security/html/wp–keyrec.html (downloaded May 25, 1997).

N. Jefferies, C. Mitchell, M. Walker, "A Proposed Architecture for Trusted Third Party Services", Cryptography: Policy and Algorithms, LNCS 1029, Springer, 1996.

J. Kilian, F. Leighton, "Fair Cryptosystems, Revisited", CRYPTO '95, pp. 208–221, Springer–Verlag, 1995.

L. Lacy, D. Mitchell, W. Schell, "CryptoLib: Cryptography in Software", AT&T Bell Labs, Crypto@research.att.com.

A. Lenstra, P. Winkler, Y. Yacobi, "A Key Escrow System with Warrant Bounds", CRYPTO '95, pp. 197–207, Springer–Verlag, 1995.

S. Micali, "Fair Public–Key Cryptosystems", CRYPTO '92, pp. 113–138, Springer–Verlag, 1992.

K. Nyberg, R. Rueppel, "Message Recovery for Signature Schemes Based on the Discrete Logarithm Problem".

T.P. Pedersen, "A Threshold Cryptosystem without a Trusted Party".

E. Verheul, H. Tilborg, "Binding ElGamal: A Fraud–Detectable Alternative to Key–Escrow Proposals", Eurocrypt '97, pp. 119–133, Springer–Verlag, 1997.

S. Walker, J. Winston, "Principles foe Use of Encryption and Key Recovery",available at http://www.tis.com/docs/products/recoverkey/recoverkey.html(downloaded May 25, 1997).

A. Young, M. Yung, "Kleptography: Using Cryptography Against Cryptography", Eurocrypt '97, pp. 62–74 Springer–Verlag, 1997.

"Digital Systems", CRC Handbook of Applied Cryptography, Ch 11, pp. 425–444.

"Digital Systems", CRC Handbook of Applied Cryptography, Ch 11, pp. 445–464.

"Digital Systems", CRC Hanbook of Applied Crytography, Ch 11, pp. 465–481.

Fair Public Cryptosystem, Micali, Cryptosytems,May, 1992.*

A Discrete Logarithm Implementation of Perfect Zero–Knowledge Blobs, Boyar et al.. J. Cryptology, pp. 63–76, Feb. 1990.*

How To Use Key Escrow, Ganesan, Comm. AMC, pp. 33–53, Mar. 1996.*

* cited by examiner

US 6,282,295 B1

AUTO-RECOVERABLE AND AUTO-CERTIFIABLE CRYPTOSTEM USING ZERO-KNOWLEDGE PROOFS FOR KEY ESCROW IN GENERAL EXPONENTIAL CIPHERS

BACKGROUND

1. Field of Invention

The field of this invention is cryptography. This invention relates to cryptosystems, and in particular to the escrowing and recovering of cryptographic keys and data encrypted under cryptographic keys. The escrow and recovery process assures that authorized entities like law-enforcement bodies, government bodies, users, and organizations, can when allowed or required, read encrypted data. The invention relates to cryptosystems implemented in software or in hardware. In particular, the invention relates to the generation of user public keys based on general exponentiation such as: the discrete logarithm problem, the problem of modular root extraction, and the problem of factoring. The mechanisms are secure and do not reduce the security of the underlying exponentiation cipher.

2. Description of Prior Art

Public Key Cryptosystems (PKC's) allow secure communications between two parties who have never met before. The notion of a PKC was put forth in (W. Diffie, M. Hellman, "New directions in cryptography", IEEE Transactions on Information Theory, 22, pages 644–654, 1976). This communication can take place over an insecure channel. In a PKC, each user possesses a public key E and a private key D. E is made publicly available by a key distribution center, also called certification authority (CA), after the registration authority verifies the authenticity of the user (its identification, etc.). The registration authority is part of the certification authority. D is kept private by the user. E is used to encrypt messages, and only D can be used to decrypt messages. It is computationally impossible to derive D from E. To use a PKC, party A obtains party B's public key E from the key distribution center. Party A encrypts a message with E and sends the result to party B. B recovers the message by decrypting with D. The key distribution center is trusted by both parties to give correct public keys upon request. A PKC based on the difficulty of computing discrete logarithms was published in (T. ElGamal, "A Public-Key Cryptosystem and a Signature Scheme Based on Discrete Logarithms", CRYPTO '84, pages 10–18, Springer-Verlag, 1985).

The current invention relates to key escrow systems. Prior methods for conducting key escrow are U.S. Pat. Nos. 5,276,737, and 5,315,658 to Micali (1994). In these patents Micali discloses a Fair Public Key Cryptosystem (FPKC) which is based on the work of P. Feldman (28th annual FOCS). The FPKC solution is not as efficient in terms of use as Auto-Recoverable and Auto-Certifiable Cryptosystems as users in a public key infrastructure need to communicate with escrow authorities. Furthermore, It has been shown that the Fair RSA PKC does not meet certain needs of law enforcement (J. Kilian, F. Leighton, "Fair Cryptosystems Revisited", CRYPTO '95, pages 208–221, Springer-Verlag, 1995), since a shadow public key cryptosystem can be embedded within it. A shadow public key system is a system that can be embedded in a key escrow system that permits conspiring users to conduct untappable communications. Kilian and Leighton disclose a Fail-safe Key Escrow system. This system has the drawback that it requires users to engage in a costly multi-round protocol in order to generate public/private key pairs. Other key escrow systems with similar inefficiencies are by De Santis et al., Walker and Winston (TIS), and the IBM SecureWay document. These solutions propose session-level escrow which requires changes in communication protocols so that the session headers in the communication protocol carry encrypted key-related information. A "Fraud-Detectable Alternative to Key-Escrow Proposals" based on ElGamal has been described in (E. Verheul, H. van Tilborg, "Binding ElGamal: A Fraud-Detectable Alternative to Key-Escrow Proposals", Eurocrypt '97, pages 119–133, Springer-Verlag, 1997). This system, called Binding ElGamal, provides for session level key recoverability, and makes no provision for preventing users from encrypting messages using the provided unescrowed public key infrastructure prior to using the Binding ElGamal system. Hence, it permits conspiring criminals to conduct untappable communications. Binding ElGamal also imposes a large amount of communication overhead per communications session and changes in communication protocol headers. An overview of key escrow schemes appears in (D. Denning, D. Branstad, "A Taxonomy for Key Escrow Encryption Systems," Communications of the ACM, v. 39, n. 3, 1996). In (N. Jefferies, C. Mitchell, M. Walker, "A Proposed Architecture for Trusted Third Party Services", Cryptography: Policy and Algorithms, LNCS 1029, Springer, 1996) and (R. Anderson, "The GCHQ Protocol and Its Problems", Eurocrypt '97, pages 134–148, Springer-Verlag, 1997) a trusted third party approach to escrow is described where the trusted third parties of the participating users are involved in every session key establishment stage, and hence provides for another cumbersome solution as well.

In the pending U.S. patent Ser. Nos. 08/864,839, 08/878, 189, 08/920,504, and 08/932,639, Auto-Recoverable and Auto-Certifiable public key cryptosystems were disclosed that have the following properties. Users of the system can generate a public/private key pair and a certificate of recoverability. This certificate of recoverability can be used to both recover the private key by the escrow authorities, and verify that the private key is recoverable. No changes in communication protocols are required. Also, no communication between users and the escrow authorities are required. The main restriction of the prior Auto-Recoverable and Auto-Certifiable cryptosystems that were proposed is that they each use specific mechanisms to hide the key information to the escrow authorities inside the certificate of recoverability. Each of the systems is limited to a specific cipher system. What is needed is a new auto-recoverable and auto-certifiable key escrow solution which uses a generic mechanism to hide key information inside the certificate of recoverability. This generic method should not reduce the security of the cipher system. A generic mechanism is a mechanism that does not limit the cipher system of the escrow authorities, and in a generic mechanism any public key encryption method can be employed. The goal of the present invention is to solve this problem. The present invention shows how to employ general public key ciphers for the escrow authorities and general exponentiation ciphers for the users in order to implement Auto-Recoverable and Auto-Certifiable key systems. The present invention discloses two solutions to the problem of key escrow using two instances of exponentiation ciphers. The first solution is based on the discrete log problem, and the second solution is based on the difficulty of factoring. Cryptosystems based on factoring, i.e., systems based on a multiplication of two large prime numbers, e.g., the RSA system by Rivest et. al. (Rivest 1983), are very popular. The present invention is applicable to all known exponentiation ciphers for the users. The invention discloses a method in which the certificate of recoverability does not reduce the security of the overall system. The present invention shows how to replace a public key infrastructure where users register their keys with a certification authority of an escrowed PKI using the same protocol messages. This is accomplished by changing the key generation mechanism and message content. This minimal change is due to the fact that the present invention is applicable to cipher systems in use in current PKI systems. We call this minimal changing mechanism "protocol embedding".

Auto-Recoverable and Auto-Certifiable Cryptosystems solutions employ the use of non-interactive proofs in computing the certificate of recoverability. More specifically, they employ a technique analagous to the Fiat Shamir non-interactive proof technique which is disclosed in (A. Fiat, A. Shamir, "How to Prove Yourself: Practical Solutions to Identification and Signature Problems", CRYPTO '86, pages 186–194, Springer-Verlag, 1987). It is known in the art how to replace such non-interactive proofs by interactive proofs. The new variant of proofs introduced by our mechanism is a proof that combines a zero-knowledge methodology with explicit encryptions of values to a third party.

SUMMARY OF THE INVENTION

The present invention provides a method to verify that information that can be used to recover a user generated private key is contained within an encryption under the generic public key of the escrow authorities. Also, this method does not involve a lot of overhead. Furthermore, this verification can be performed by anyone in possession of the escrow authorities public key. The present invention can replace a public key infrastructure which is based on users' keys based on the discrete log problem or on factoring (e.g., RSA keys as in Rivest 1983) without changing the encryption and decryption functions since the keys generated are compatible. The present invention is also compatible with a usual Public Key Infrastructure and does not require other changes (like changes of communication protocols and computations). Therefore the present invention constitutes a new protocol design method called protocol embedding. The present invention consists of a setting up process and three functions which process signals in different ways. The functions are key generation, key verification, and key recovery.

In the setup process of the prefered embodiment, the participants agree upon a set of initial public parameters and the authorities generate an escrowing public key and corresponding private keys. The initial parameters and the escrowing public key are the public parameters of the system. The escrowing authorities, Certification Authority (CA), and users of the system all have access to the public parameters. This process is analagous to a certification authority in a public key infrastructure making its public key, address, and other information publicly known.

In the key generation process, the method generates a user's public/private key pair, and a certificate of recoverability which is a string of information which includes encryptions of information that allows the recovery of the user's private key, encrypted under the escrowing public key. The signal information containing the user's public key, and the certificate of recoverability can be transmitted to any entity. In the verification process, the user transmits this signal to the verifier. The verification process takes the input signal, processes it, and outputs either true or false. A result of true indicates that the user's private key is recoverable from the certificate of recoverability by the escrow authorities. A result of false indicates that the private key is not recoverable. The invention is designed such that it is intractable for the user to generate a public key, and certificate of recoverability such that the key is not escrowed and such that it passes the verification process with a result of true. In the prefered embodiment, the users certify their public keys with the registration authority of the certification authority (CA) who then signs their public key after successful verification. A public key together with a CA's signature on a string that contains the public key, the user's identity, and other information, constitutes a certified public key. The other information can include the certificate of recoverability in the present invention. It can also include the message digest of the certificate of recoverability. In more detail, upon receiving the user's public key, and certificate of recoverability, the CA verifies that the corresponding private key is recoverable. If it is, (namely, the verification process outputs true) the public key is certified and/or made publicly available by the CA. The CA keeps a copy of the certificate of recoverability, perhaps in encrypted form under its own key. The user is only required to keep his private key and to have access to the public key database containing the public keys of other users as in a typical PKI.

In the recovery process, the escrow authorities use the user's certificate of recoverability and public key as an input signal. The escrow authorities process the certificate of recoverability, and the corresponding user's private key is the resulting output signal. When the escrow authorities are implemented in tamper-proof hardware, it is possible to output decryptions of messages encrypted under the private key rather than the private key itself. In the prefered embodiment the user's certificate of recoverability and public key is obtained by the escrow authorities from the CA. Thus, escrowing of user's keys relies on the CA, which is the typical point of trust in a PKI.

The present invention is useful in any environment that demands the recovery of private keys, or keys encrypted under these keys, or information encrypted under these keys. Such environments arise in law enforcement nationally and internationally, in the business sector, in secure file systems, on the Internet, in Certified Mail services, etc. The successful escrowing of private keys implies the successful escrowing of public key encrypted information, and hence the present invention his many applications.

The present invention is robust with respect to any underlying technology since it can be implemented in both hardware and software. When implemented in software it can be easily scrutinized to insure that it functions as desired and to insure that it does not compromise the security of its users. The software implementation allows for fast and easy dissemination of the invention, since it can be disseminated in source code form over diskettes or over a computer communication network. The present invention is also communication efficient. At most, one, two, or three message exchanges suffice for the various embodiments of the present invention. The signals can be processed quickly and the signals themselves constitute a small amount of information. The invention does not require changes in communication protocols used in typical unescrowed PKI's (e.g., session key establishment, key distribution, secure message transmission, etc.). The invention is therefore compatible with typical PKI's. The present invention thus provides a very efficient way of escrowing and recovering cryptographic keys. The present invention does not require changes in header information of messages, content of messages, or additional messages outside the PKI protocols, and as mentioned above does not require changes of cryptographic encryption and decryption in systems. Finally, the present invention is based solely on well-established and accepted security assumptions which are associated with the user's cipher mechanism, to assure the security of the user's key in the process. The present invention can be easily adapted to incorporate numerous CA's and numerous escrow authorities.

THE DRAWING

The present invention will be described with reference to the accompanying FIGS. 1–7.

Figure 3:
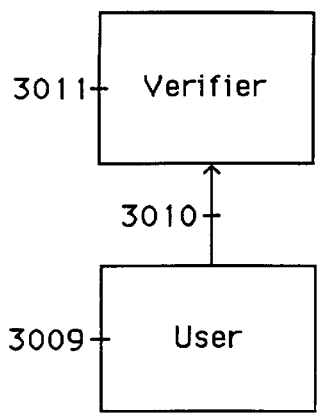

FIG. 3. is a data flow diagram of the process of verifying the recoverability of a private key.

Figure 4:
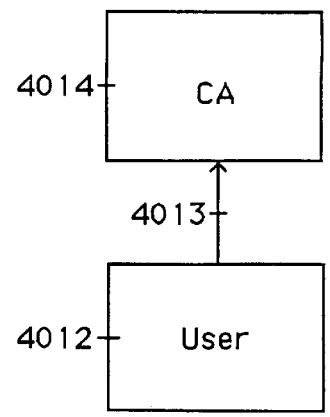

FIG. 4 is a data flow diagram of the process of registering a key using the invention.

Figure 5:
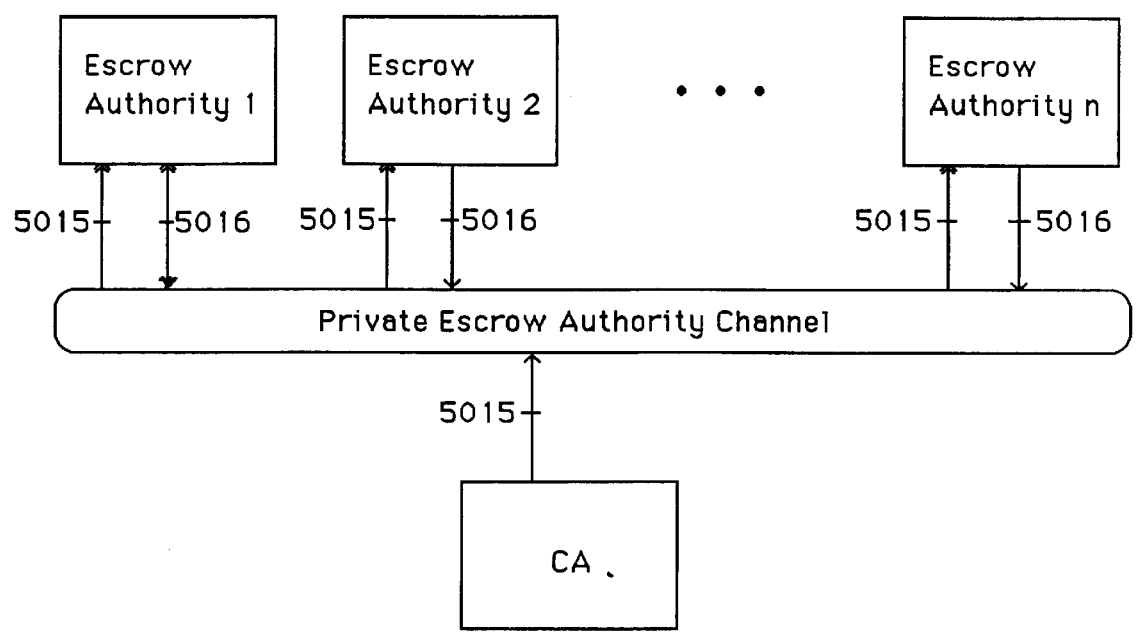

FIG. 5 is a data flow diagram of the process of private key recovery by the escrow authorities.

Figure 6:
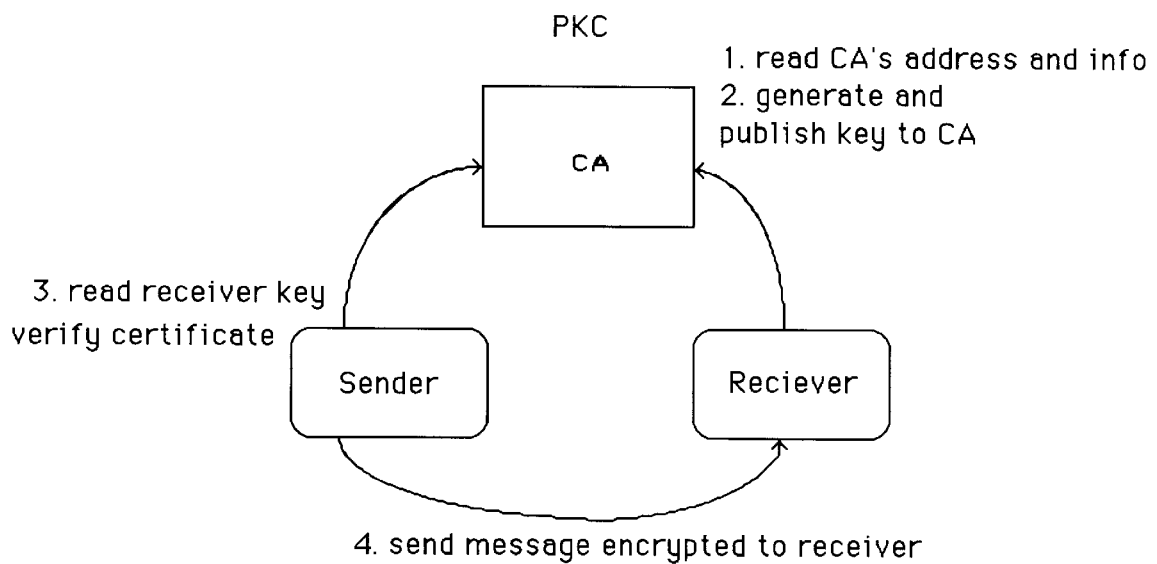

FIG. 6 describes a generic public key system and its main components and operations.

Figure 7:
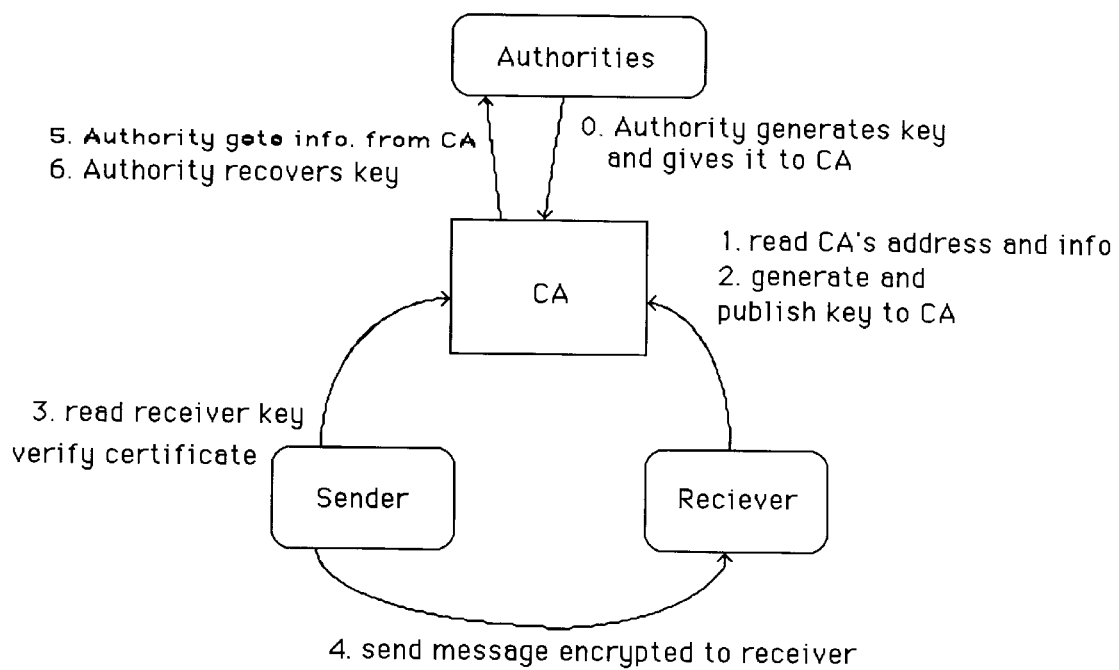

FIG. 7 describes the escrowable public key system which results by employing the present invention and its main components and operations.

DESCRIPTION OF THE INVENTION

The following is a description of the prefered embodiment of the present invention. Variations on the prefered embodiment will accompany the description of the prefered embodiment wherever applicable. The hashing algorithm selected is SHA (Schneier 2nd edition, pages 442–445), though any cryptographic hashing algorithm will suffice in its place. We use the least significant bits of the hash results for convenience, but any subset of bits is possible. In the prefered embodiment, parameters are chosen uniformly at random from their respective groups or domains. Alternate embodiments include alterations of the probability distributions from which such values are chosen. Such choices based on random number generators or pseudo-rardom generators are available in the art.

Figure 1:
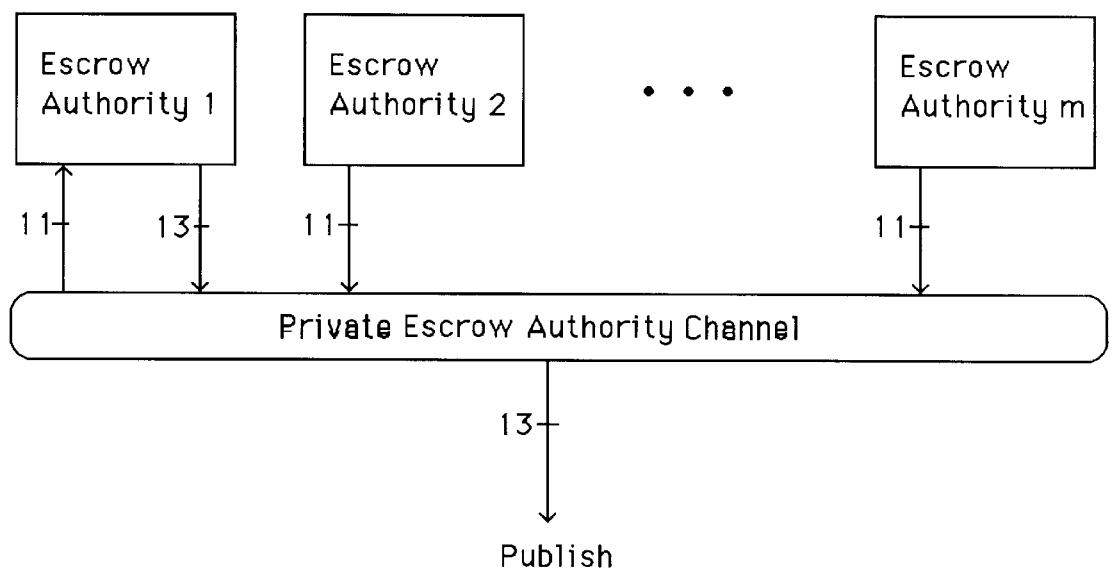
FIG. 1 is a data flow diagram of the process of setting up the method of the invention for use with m escrow authorities.

The system setup of the prefered embodiment shown in FIG. 1 initiates the cryptosystem. In the prefered embodiment, escrow authority i for $1 \leq i \leq m$ generates a private share $D_i$, and corresponding public share $E_i$. The private shares $D_i$ form the shared private key D. Escrow authorities 2 through m send their $E_i$ to escrow authority 1. This is depicted by step 11. Escrow authority 1 combines all the public shares $E_i$ and computes the shared public key E. The value for E is published by escrow authority 1, as depicted in step 13. Each authority i keeps $D_i$ private. As a concrete example, the escrow authorities can generate a strong prime p and a value g which generates $Z_p$. Share $D_i$ can be chosen uniformly at random from $[1 \ldots p-1]$, and $E_i=$(g raised to the $D_i$ power) mod p. E is the product of all the values $E_i$ modulo p. Variations on joint generation of keys are possible, as well as an implementation with a single escrow authority.

Figure 2:
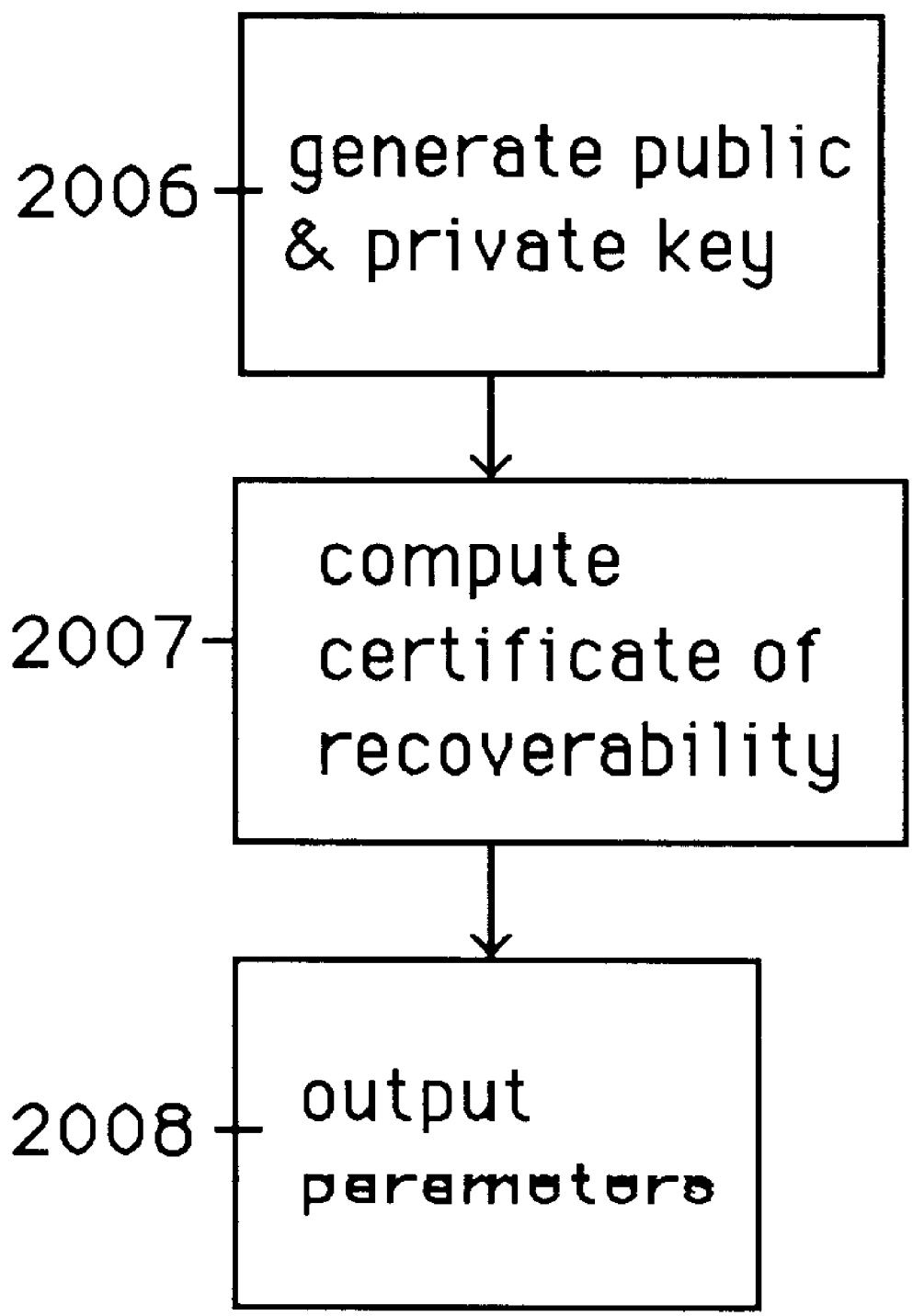
FIG. 2 is a flow chart of the basic steps of the process of generating a public/private key pair and certificate of recoverability using the invention.

FIG. 2 is a diagram showing the process of how a user's system generates a public/private key pair and a certificate of recoverability. Having obtained (and verified as much as possible) the signal E that is made available to users by the escrow authorities, the user system proceeds to generate an ElGamal public key (y,g,p) for the user (T. ElGamal, "A Public-Key Cryptosystem and a Signature Scheme Based on Discrete Logarithms", CRYPTO '84, pages 10–18, Springer-Verlag, 1985). The user system chooses a private key x uniformly at random from $[1 \ldots p-1]$, and computes y to be (g raised to the x power) modulo p. This key generation process corresponds to step 2006.

The system then proceeds to step 2007 and computes a certificate that can be used by any interested party, in particular the CA, to verify thit the user's private key x can be recovered from the certificate of recoverability P. Let ENC(a,s,E) denote the public key encryption of the message a under public key E using randomness s. Here ENC is a semantically secure probabilistic public key encryption, where the string s is used for the randomness in the probabilistic encryption. For example, ENC can be an ElGamal encryption, or an optimal asymmetric encryption (Bellare-Rogaway, "Optimal Asymmetric Encryption", Eurocrypt '94). Let DEC be the corresponding public key decryption function which is performed in a shared fashion. Hence, $DEC(ENC(a,s,E),D_1,D_2, \ldots ,D_m)=a$. P is constructed according to the following algorithm:

1. P=()
2. for i=1 to M do
3. choose $r_i$ randomly from the domain $(1 \ldots p-1)$
4. choose two random strings $s_{i,1}$ and $s_{i,2}$ for use in ENC
5. $Q_i$=(g raised to the $r_i$ power) mod p
6. $C_{i,1}$=ENC($r_i,s_{i,1}$,E)
7. $C_{i,2}$=ENC($r_i$-x mod p-1,$s_{i,2}$,E)
8. add ($Q_i$, $C_{i,1}$, $C_{i,2}$) to the end of P
9. val=H(P)
10. set $b_1,b_2 \ldots ,b_M$ to be the M least significant bits of val, where $b_i \in Z_2$
11. for i=1 to M do
12. $w_i=r_i-b_ix$
13. $Z_i=(w_i,s_{i,j})$ where $j=1+b_i$
14. add $Z_i$ to the end of P Thus, $P=((Q_1,C_{1,1},C_{1,2}), \ldots ,(Q_M,C_{M,1},C_{M,2}),Z_1, \ldots ,Z_M)$. H is a suitable public one-way hash function (e.g., SHA), so the $b_i$'s can be recovered from P. The values for b are the challenge bits, and this method of finding them and using them is analagous to the Fiat-Shamir Heuristic. The user system outputs (y,x,P) in step 2008. Note that the user has the option to interactively prove that his or her private key x is recoverable by the escrow authorities. This will be addressed in more detail later. M is a large enough parameter of security (e.g., M=50).

The description of the embodiment has thus far explained how the system is setup for use by the CA and authorities, and how the system is used by users (potential receivers) to generate public/private key pairs and certificates of recoverability. These certificates are strings showing to anyone presented with them that the private key corresponding to the public key generated is recoverable by the escrow authorities using P. The following describes how the invention is used by the user to prove to a verifier that x is recoverable from P. This process is depicted in FIG. 3. The verifier can be the CA, an escrow authority, or anyone else who knows the system parameters.

The verification process of FIG. 3 is as follows. In step 3009, the user generates a public/private key pair, and a certificate using the invention as described above. In step 3010, the user transmits a signal containing these parameters to a verifier. In step 3011 the verifier uses this signal to verify whether or not the user's private key is recoverable by the escrow authorities. In this process, the verifying system takes y, the corresponding certificate P, and the escrowing public key E. The verifying system first checks that y<p. The verifying system checks that all of the values in P lie in the correct sets. The verifying system also checks that the values $C_{i,j}$ for all i and j, do not contain any repetitions. The verifying system checks that none of the $Q_i$ for all i are repetitious. If any of these verifications fail, then false is returned. The verifying system then computes $b_1, b_2, \ldots, b_M$ in the same way as in the certificate generation process. For i=1 to M, the verifying system verifies the following things:
1. $ENC(w_i, s_{i,j}, E) = C_{i,j}$ where $j = 1 + b_i$
2. $(Q_j/(y \text{ raised to the } b_i \text{ power})) \mod p = (g \text{ raised to the } w_i \text{ power}) \mod p$ The verifying system returns true as long as all the verifications pass and as long as both 1 and 2 above are satisfied for $1 \leq i \leq M$. The invention may take subsequent action and indicate to the verifier that the public key is invalid in the event that false is returned. Similarly, the verifying system may inform the verifier of a validation that passes (the verifying system returns true).

In FIG. 4, the user certifies his or her public key with the CA. In step 4012 of this process, the user generates his or her public key and certificate of recoverability, as previously described. The user transmits this signal to the CA. This corresponds to step 4013 of FIG. 4. In step 4014 the CA acts as a verifier and verifies that the user's private key is recoverable by the escrow authorities.

So far, steps 4012 through 4014 are identical to steps 3009 through 3011 in the key verification process of FIG. 3. However the CA, in addition, will make keys that pass the verification process available to others upon request and/or certify them. If the user's public key fails the verification process, then either the certification attempt is ignored, or alternatively the user is notified of the failed certification attempt.

Depending on the demands of the environment in which the invention is used, users may be required to submit extra information in order to register a public key and to certify that they know the private key portion without divulging it. Such information could be a password, social security number, previously used private key, etc. In the case that the CA is a trusted entity, the CA can simply digitally sign the user's public key together with the user's name and additional information, and make the key along with the CA's signature on this information available on request. If the CA is not trusted (which is not the typical assumption in PKI), then the certificate should be stored in the public file and the certificate together with the certificate of recoverability should be given to the escrow authorities, who in turn can insure recoverability. This completes the description of the public key certification process. We note that the CA keeps the certificate of recoverability, possibly in encrypted form under its own key with authentication information for integrity.

The last process to describe is the private key recovery process. This process is depicted in FIG. 5. In this process, the invention is used by the m escrow authorities to recover the user's private key based on P. In this process, all m of the escrow authorities obtain y and P, as depicted in step 5015 of FIG. 5. In an alternate embodiment the CA transmits y and P and/or other parameters to one or more of the authorities. Thus they are already in possession of y and P. At this point escrow authorities use a subset of their shares $D_1, D_2, \ldots, D_m$ to decipher P to open all of the unopened $C_{i,j}$ (using DEC for example). This is accomplished by having escrow authority i recover the ith shares of the user's private key. In this process, escrow authority i extracts the M values for the unopened $C_{i,j}$ from P and decrypts them using $D_i$. The resulting values are pooled with the values from the other escrow authorities, as depicted in step 5016 of FIG. 5. The pool is then used by the authorities to decrypt all of the unopened values $C_{i,j}$ from P. Thus all of the plaintexts corresponding to all $C_{i,j}$ are known to the escrow authorities. There are alternative methods in the art for recovering the plaintext corresponding to the unopened $C_{i,j}$, so that the unopened plaintext is represented distributively among the authorities. The escrow authorities check the plaintext of each pair $C_{i,1}$ and $C_{i,2}$ for a pair of values that when summed together mod p-1, are equal to the exponent x in y=(g raised to the x power) mod p. Also, the quantity (g raised to the x power) mod p can be matched against the public y to assure correctness. Once such a pair is found, the private key of the user has been found.

Instead of executing the last algorithm which recovers the private exponent in software, it can be done in a tamper-proof environment. The environment gets the key (y,g,p), and a message encrypted under that key. The above algorithm is executed and the decryption key is derived. The decryption key is applied to the ciphertext, and the plaintext is output by the environment. For certain public key systems of escrow authorities (based on the discrete logarithm) tamper-proofness is not required to derive messages only, as is known in the art.

What has been described is an Auto-Recoverable and Auto-Certifiable (ARC) cryptosystem where the public key of the user is based on the discrete log problem in domains where g is known to be a generator. The users of such a cryptosystem employ the public key system in a way that is identical to a typical PKI based on discrete logs, for secure communications. This is demonstrated schematically in FIGS. 6 and 7. FIG. 6 is a typical public key cryptosystem in a PKI environment. The following are the steps that are followed by the users. (1) The user first reads the CA's information and address. (2) The user generates a public/private key pair and sends the public key to the CA. The registration of the authority in the CA verifies the identity of the user, and publishes the public key together with the CA certificate on that key, identifying the user as the owner of that key. (3) For another user to send a message to that user, the public key is read from the CA's database and the certificate is verified. (4) Then, the message is encrypted under the public key and sent. FIG. 7 schematically describes the ARC cryptosystem. The additional operations are as follows. (0) The authority generates the escrowing public key and gives it to the CA. Steps 1 and 2 are analogous, except that a proof is sent along with the public key. Steps 3 and 4 are the operation of the system and are identical. Steps 5 and 6 describe the case in which keys are recovered from escrow. (5) The escrow authority gets information from the CA. (6) The escrow authority recovers the user's private key. The above method of implementing an ARC cryptosystem on top of a PKI environment is protocol embedding.

The authorities can require that the certificate of recoverability be sent along with the public key so that the user's parameters can first be verified using the verification process by the authorities as well. This completes the description of the primary embodiment and variations thereof.

A variation on the primary embodiment is to have p=2q+1=4r+3, where p, q, and r are primes. In this variation $g_1$ generates $Z_{2q}^*$, and x is found by choosing k randomly and computing x=($g_1$ raised to the k power) mod 2q. y is (g raised to the x power) mod p, and is the public key, and the certificate is formed, verified, and recovered as previously described. This variation enables k to be used a signing private key for use in a signature algorithm analagous to the ones disclosed in the pending U.S. patent Ser. No. 08/878, 189. Here x is recoverable as described above. Note that a proof of knowledge of k can be added to the certificate of recoverability. Such proofs are known in the art.

We will now describe our secondary embodiment of this invention. In this embodiment, the users of the system generate composite public keys. The user system generates n and s in the same way as described in the pending U.S. patent Ser. No. 08/920,504. Recall that n is the product of two (preferably strong) primes p and q, and s is a string that can be used in conjunction with a public one-way function to derive the upper order bits of n. Let e and d denote the public and private exponents (e.g., for RSA), respectively. The following is how P is constructed:

1. P=()
2. choose a string $t_0$ randomly mod n
3. add $t_0$ to the end of P
4. for i=1 to M do
5. choose $a_{i,1}$ randomly from the domain (1 ... (p-1)(q-1))
6. compute $a_{i,2}$=d-$a_{i,1}$ mod (p-1)(q-1)
7. choose two random strings $s_{i,1}$ and $s_{i,2}$ for use in ENC
8. $t_i$=H($t_{i-1}$)
9. $v_{i,1}$=($t_i$ raised to the $a_{i,1}$ power) mod n
10. $v_{i,2}$=($t_i$ raised to the $a_{i,2}$ power) mod n
11. $Q_i$=($t_i$,$v_{i,1}$,$v_{i,2}$)
12. $C_{i,1}$=ENC($a_{i,1}$,$s_{i,1}$,E)
13. $C_{i,2}$=ENC($a_{i,2}$,$s_{i,2}$,E)
14. add ($Q_i$, $C_{i,1}$, $C_{i,2}$) to the end of P
15. val=H(P)
16. set $b_1$,$b_2$, ... ,$b_M$ to be the M least significant bits of val, where $b_i \in Z_2$
17. for i=1 to M do
18. $Z_i$=($a_{i,j}$,$s_{i,j}$) where j=1+$b_i$
19. add $Z_i$ to the end of P
20. add s to the end of P Thus, P=($t_0$,($Q_1$,$C_{1,1}$,$C_{1,2}$), ... ,($Q_M$,$C_{M,1}$,$C_{M,2}$),$Z_1$, ... ,$Z_M$,s). H above can be based on SHA or on concatenations of a few SHA applications to generate the $t_i$ of appropriate size. It is most likely that the $t_i$ will be in $Z_n^*$.

The verifying system is a bit different than before. The verifying system first checks that n was chosen from the correct set of values. Let u denote the integer corresponding to the k/2 upper order bits of n. The verifying system makes sure that either H(s)=u or that H(s)=u+1, as described in the pending U.S. patent Ser. No. 08/920,504. The verifying system checks that all of the values in P lie in the correct sets. For example, the verifying system checks that the $t_i$ fall within the range of H, and that $a_{i,j}$<n (or some function of n) where j is 1 or 2. The verifying system also checks that $t_i$=H($t_{i-1}$) for i ranging from 1 to M. The verifying system checks that elements of the tuple $Q_i$ for each i does not contain repetitions, and also that the elements in the pair $Z_i$ for all i does not have repetitions. If any of these verifications fails, then false is returned. The verifying system then computes $b_1$,$b_2$, ... ,$b_M$ in the same way as in the certificate generation process. For i ranging from 1 to M, the verifying system verifies the following things:

1. (($v_{i,1}$ multiplied by $v_{i,2}$) raised to the e power) mod n=$t_i$
2. ($t_i$ raised to the $a_{i,j}$ power) mod n=$v_{i,j}$, where j=1+$b_i$ The verifying system returns true as long as all the verifications pass and as long as all both criterion are satisfied for $1 \leq i \leq M$.

The escrow authorities recover the user's private key as follows. For i ranging from 1 to M, the authorities compute $w_i$ to be the sum of the plaintexts corresponding to $C_{i,1}$ and $C_{i,2}$. If a value $w_i$ is found such that ($t_i$ raised to the (e$w_i$) power) mod n equals $t_i$, then $w_i$ constitutes a valid RSA private key corresponding to e. It is well known in the art how to factor n given such a value $w_i$. Note that the RSA function is a homomorphic function and the above embodiment is applicable to homomorphic functions similar to RSA. We remark that from the above embodiment it is clear that this 'proof technique' for showing that a value is recoverable by the escrow authorities can be generalized to any homomorphic function.

In another embodiment, the interactive version of the proof for P can be used. In this interactive proof, the choice of $t_i$ can be done jointly by the parties using standard commitment techniques known in the art, and the values $v_{i,1}$ and $v_{i,2}$ can be blinded by two exponents that sum up to one that are determined by the verifier. In a non-interactive proof the $b_1$ to $b_M$ can also be determined by the verifier however we can still choose them by applying H, generating a P. This will enable P to be published. Note that by publishing the original P as described above, a shadow public key cryptosystem may result. This follows from the fact that a value for $Z_i$ can be chosen explicitly by a malicious user.

A primary PKI using our system can be the RSA system (Rivest 1983). In yet another embodiment, the public exponent of the escrow authorities is equal to 2. This implies that the commitments are performed using Rabin's system which is known in the art. The method is general and applies also to composite ElGamal encryption and exponentiation ciphers over various domains (e.g., elliptic curves).

All the embodiments of the present invention can be used to construct hierarchical escrow systems in a straightforward fashion. The notion of a hierarchical key escrow system was disclosed in the pending U.S. patent Ser. No. 08/932,639.

The first embodiment describes key generation where $C_{i,1}$, $C_{i,2}$, and $Q_i$ correspond to the value encrypted under $C_{i,1}$ and $C_{i,2}$. One can extend the encryptions to have $C_{i,1}$, $C_{i,2}$, ... ,$C_{i,k}$ and $Q_{i,1}$, $Q_{i,2}$, ... ,$Q_{i,k-1}$ exponentiations corresponding to $C_{i,1}$, $C_{i,2}$, ... ,$C_{i,k-1}$. The challenges that are opened are one or a subset of the $C_{i,j}$'s. The encryptions $C_{i,j}$'s may be computed using a public key of different escrow authority keys, thus the user can control which collaboration of authorities is required for recovery. A similar extension applies to the second embodiment.

Thus, there has been described a new and improved key escrow system, its variants, and applications. Also described is a method of building key escrow systems on top of a PKI based on protocol embedding mechanisms. It is to be understood that the preferred embodiment and its alternatives are merely illustrative of some of the many specific embodiments which represent applications of the principles and paradigms of the present invention. Clearly, numerous and alternate arrangements can be readily devised by those who are skilled in the art without departing from the scope of the present invention; some of these variations were discussed above.

What we claim is:

1. A method for generating public keys, and a zero knowledge proof that the keys are known to the user and are recoverable, called a certificate of recoverability comprising the steps of:

the user's system generating a random string of bits with restrictions imposed by system parameters;

the user running a key generation algorithm to get a secret and public key pair using the random string and public parameters;

the user, using said key pair, constructing a zero knowledge proof being a string of bits whose public availability does not compromise the secret key, but at the same time provides confidence to another entity that said secret key is known to its user and is recoverable by a third party;

where said proof computation involves standard encryption operations, standard one-way function operations, and exponentiation operations.

2. A method for generating public keys, and a zero knowledge proof that the keys are known to their user and are recoverable, called a certificate of recoverability, comprising the steps of:

the user's system generating a random string of bits based on system parameters;

the user running a key generation algorithm based on system parameters to get a secret and public key pair using the random string and public parameters;

the user engaging in a zero knowledge protocol with another entity whereby the said other entity repeatedly sends a challenge string and said user sends a response based on the challenge and the public and secret key pair such that the public availability of said challenges and responses does not compromise the secret key, but at the same time provides confidence to said other entity that said secret key is known and recoverable by a third party;

where said proof computation involves standard encryption operations, standard one-way function operations, and exponentiation operations.

3. A method for registering users into a Public Key Infrastructure (PKI) such that a user and his public key, which is based on an exponentiation cipher, is registered only upon verifying the fact that the key is known and recoverable, comprising the steps of:

the user generating the keys as in claim 1, and in addition:
the user proving his identity to a registration authority;
the user sending to the registration authority the public key and a zero-knowledge proof of the fact that the secret key is known and recoverable by a third party as in claim 1;
said proof involves standard encryption, decryption, and exponentiation;
if the registration authority is convinced of the validity of said fact and of the user's identity, then a certification authority issues a certificate for user's said public key.

4. A method as in claim 3 wherein the registration authority, after verifying the validity of said public key, publishes said public key in a public key database, together with the user ID.

5. A method as in claim 3 wherein the registration authority certifies the public key of said user by signing user's said public key using said registration authority's secret key, and where said registration authority retains the proof as a certificate of recoverability of the fact that the secret key is known and recoverable.

6. A method for a set of key recovery agents to recover the user's private key or information encrypted under said user's corresponding public key, that uses a certified public key of said user available in a public key directory, information contained in a user's certificate of recoverability, and public parameters, comprising of the following steps:

a subset of said set of key recovery agents read the user's public key from the public key directory;
each member of said subset runs a key recovery algorithm based on the following inputs: said user's certified public key, the public system parameters, and the private key of said member of said subset;
running said key recovery algorithm resulting in a partial result of member of said subset; all said partial results of said members of said subset are combined using a software algorithm or a tamperproof hardware implementation of it, to generate said secret key of said user or said information encrypted under said user's public key;

where a proof computation involves standard encryption operations, standard one-way function operations, and exponentiation operations.

7. A method for generating public keys and a zero knowledge proof that the keys were generated by a specific algorithm, called certificate of recoverability, comprising the following steps:

generating a public and private key pair;
conducting a multi-round procf where each round comprises of the following steps:
choosing at least two values with a property that knowledge of said values implies knowledge of said user's private key;
cryptographicly committing to said values by enciphering them using a function which takes a public key of escrow authorities;
obtaining challenge bits from a verifier or a random oracle;
using said challenge bits to reveal one or more of said values;
opening one or more cryptographic commitments based on said challenge bits;
outputing said values and said opened cryptographic commitments;

where in a non-interactive proof, said output constitutes the transcript of the proof, and in an interactive proof, said output is information sent from the prover to the verifier, and said challenge bits are sent from the verifier to the prover.

8. A method for an entity to verify the recoverability of a private key generated as in claim 7 comprising the steps of:

the entity obtaining the public key as computed in claim 7;
the entity verifying the proof as constructed in claim 7 if the proof was non-interactive;
the entity engaging in the proof as described in claim 7 if the proof was interactive;

where if any of the verifications fail then the verifier assumes that the private key is not recoverable by the escrow authorities and where otherwise, it is assumed that the private key is recoverable by the escrow authorities.

9. A method for an entity to verify the recoverability of a private key as in claim 8, taking the subsequent action of informing the entity whether the public key is escrowed properly or not.

10. A method as in claim 8 wherein the functions that verify recoverability are implemented as a hardware device.

11. A method of converting a protocol used in a public key infrastructure, where said conversion involves having the escrow authorities publish their keys, and having the users use a different algorithm for key generation which includes a message to the certification authority, and with no explicit interaction between said users and said escrow authorities.

12. A method for registering users into a Public Key Infrastructure (PKI) such that a user and his public key, which is based on an exponentiation cipher, is registered only upon verifying the fact that the key is known and recoverable, comprising the steps of:

the user generating the keys as in claim 2, and in addition:
the user proving its identity to a registration authority;

the user sending to the registration authority the public key and a interactively participates in a zero-knowledge proof of the fact that the secret key is known and recoverable as in claim 2;

said proof involves standard encryption, decryption, and exponentiation;

if the registration authority is convinced of the validity of said fact and of the user's identity, then a certification authority issues a certificate for user's said public key.

13. A method as in claim 1 where said secret and public key pair is based on the RSA factoring cryptosystem.

14. A method as in claim 1 where said secret and public key pair is based on the ElGamal discrete-log cryptosystem.

15. A method as in claim 2 where said secret and public key pair is based on the RSA factoring cryptosystem.

16. A method as in claim 2 where said secret and public key pair is based on the ElGamal discrete-log cryptosystem.

17. A method for a first party, called user, to initiate himself into a public key system by reading parameters of a second party, called certification authorities, and an authorities' public key from a third party called escrow authorities, generating a public-key and a corresponding private key, using said public and private keys in generating a string called a certificate of recoverability, sending to said certification authorities said private key and said certificate of recoverability, where said certificate of recoverability assures said second party that at least one of said corresponding private key and cleartext information encrypted by said public key is recoverable by anyone holding a private key corresponding to said authorities' public key.

18. A method for a user's system to electronically compute and generate a public/private key pair and a certificate of recoverability having obtained (and verified as much as possible) the signal E that is made available to users by a third party (the escrow authorities), wherein the user system performs the following steps:

(1) generates an ElGamal public key (y,g,p) by choosing private key x uniformly at random from $\{1,\ldots,p-1\}$ and computing y to be (g raised to the x power) modulo p;

(2) generates a string P using the following steps 1–14:
 1. P=()
 2. for i=1 to M do
 3. choose $r_i$ randomly from the domain $\{1,2,\ldots,p-1\}$
 4. choose two random strings $s_{i,1}$ and $s_{i,2}$ for use in ENC
 5. $Q_i$=(g raised to the $r_i$ power) mod p
 6. $C_{i,1}$=ENC($r_i$, $s_{i,1}$, E)
 7. $C_{i,2}$=ENC($r_i$-x mod p-1, $s_{i,2}$, E)
 8. add ($Q_i$, $C_{i,1}$, $C_{i,2}$) to the end of P
 9. val=H(P)
 10. set $b_1, b_2, \ldots, b_M$ to be the M least significant bits of val, where $b_i$ is in $\{0,1\}$
 11. for i=1 to M do
 12. $w_i=r_i-(b_i)x$
 13. $Z_i=((w_i),s_{i,j})$ where $j=1+b_i$
 14. add $Z_i$ to the end of P;

where ENC(a,s,E) denotes the public key encryption of the message "a" under public key E using randomness s, where DEC(ENC(a,s,E),$D_1,D_2,\ldots,D_m$)=a, where H is a suitable hash function, where M a parameter (e.g., 100) and where the resulting P=(($Q_1, C_{1,1}, C_{1,2}$), ...,($Q_M, C_{M,1}, C_{M,2}$), $Z_1, \ldots, Z_M$) is called the certificate of recoverability.

19. The method of claim 18 where the process of generating P is performed interactively and the $b_1, b_2, \ldots, b_M$ are generated by the interacting party rather than by the hash function.

20. A method as in claim 18, but where the key generated is based on multiplication of primes into a composite number which is a portion of the public key.

21. A method of verification of a recoverability of a generated key chosen as in claim 18, where the verifying system takes y, the corresponding certificate P, and the authorities' public key E, comprising the following steps:

(1) checking that y<p (2) checking that all of the values in P lie in the correct sets (3) checking that the values $C_{i,j}$ for all i and j, do not contain any repetitions (4) checking that none of the $Q_i$ for all i are repetitious (5) if any of these verifications fail, then false is returned (6) computing $b_1, b_2, \ldots, b_M$ in the same way as in the certificate generation process (7) for i=1 to M, verifying the following 1–2 things:
 1. ENC($w_i, s_{i,j}$, E)=$C_{i,j}$ where $j=1+b_i$
 2. ($Q_i$/(y raised to the $b_i$ power)) mod p=(g raised to the $w_i$ power) mod p;

(8) returning the value true as long as all the verifications pass and as long as both 1 and 2 above in step (7) are satisfied for $1<=i<=M$;

(9) indicating to the proper party that the public key is invalid in the event that false is returned or valid if true.

22. The method of claim 21 where the process of verifying P is performed interactively and the verifier generating the bits $b_i, b_2, \ldots, b_M$ and checking the validity of the answers to these bits.

23. A method as in claim 21, but where the key verified is based on multiplication of primes into a composite number which is a portion of the public key.

24. A public key registration process in which users compute keys as in claim 18 and certification authorities validate keys prior to their publication as in claim 21, resulting in certification only of keys which pass true on validation.

25. A method for authorities to recover a key out of the value y and the certificate of recoverability P generated in claim 18 where the method includes m authorities with each authority i holding a share $D_i$ of the authorities' decryption key D, and wherein said authorities use a subset of their shares $D_1, D_2, \ldots, D_m$ to decipher P to open all of the unopened $C_{i,j}$ by having escrow authority i recover the i-th share of the user's private key, and wherein authority i extracts the M values for the unopened $C_{i,j}$ from P and decrypts them using $D_i$, and wherein the resulting values are pooled with the values from the other authorities to decrypt all of the unopened values $C_{i,j}$ from P, and wherein the authorities check the plaintext of each pair $C_{i,1}$ and $C_{i,2}$ for a pair of values that when subtracted mod p-1, are equal to the exponent x in $y=g^x$ mod p, which results in recovery of the private key.

26. Recovery method as in claim 19 for keys which are based on composite numbers.

* * * * *